United States Patent [19]

Stowe et al.

[11] 4,060,249
[45] Nov. 29, 1977

[54] ROD PACKING

[75] Inventors: Milton G. Stowe, Dallas; Barry J. Brooks, Midland, both of Tex.

[73] Assignee: WPC, Inc., Midland, Tex.

[21] Appl. No.: 751,390

[22] Filed: Dec. 17, 1976

[51] Int. Cl.$^2$ ............................................. F16J 15/00
[52] U.S. Cl. ...................................... 277/24; 166/82; 277/216
[58] Field of Search .................... 166/81, 82, 83, 84; 175/84; 277/216, 217, 218, 219, 220, 221, 24

[56] References Cited

U.S. PATENT DOCUMENTS

| 1,453,673 | 1/1923 | Hebert | 277/216 |
| 2,616,504 | 11/1952 | Osmun | 166/83 |
| 2,842,386 | 7/1958 | Regan | 166/82 |
| 2,937,894 | 5/1960 | Martin et al. | 175/84 |
| 3,129,009 | 4/1964 | Simpson | 166/82 |
| 3,844,573 | 10/1974 | Wright | 277/216 |

Primary Examiner—Robert I. Smith
Attorney, Agent, or Firm—William R. Laney

[57] ABSTRACT

A rod packing for stripping oil from a string of sucker rods as they are removed from the oil well, and including a pair of interfitting semicylindrical packing halves joinable to each other at a diametrical plane by pairs of mating protuberances and sockets. An axial bore is formed by mating semicylindrical grooves in the packing halves which are in registry when the packing halves are joined. Opposite ends of the axial bore communicate with frusto-conical recesses centered in the opposed planar ends of the joined semicylindrical packing halves, and each of the packing halves includes a pair of spaced, substantially parallel, chordally extending grooves in one of the planar ends thereof positioned to intersect the respective frusto-conical recess in that planar end, and to receive accumulated liquid therefrom.

9 Claims, 5 Drawing Figures

ROD PACKING

FIELD OF THE INVENTION

This invention relates to elastomeric oil saver devices, and more particularly, to rod packing devices used for wiping and stripping rods removed from an oil well during swabbing or cleanout operations, or other working of the well.

BRIEF DESCRIPTION OF THE PRIOR ART

A number of elastomeric packing structures have heretofore been proposed for wiping oil from a string of sucker rods or a wire line utilized for swabbing or cleaning out an oil well at the time that the rod string or wire line is pulled upwardly in removing it from the tubing string. In general, such devices operate by providing a rubber or other elastomeric packing of a generally cylindrical configuration which surrounds a central bore through which the rods or wire line pass during removal from the well. Generally, the packings thus provided are contained within a housing having members adjustably movable against the packing to compress it inwardly against the rod string or wire line so that a stripping or squeezing action is exerted by the packing of the rod string or wire line moving therethrough.

One type of cylindrical elastomeric packing used for the purpose described and heretofore patented is the packing illustrated in Scaramucci U.S. Pat. No. 2,968,505. The Scaramucci packing includes a pair of semicylindrical packing halves which are joinable at a diametrical plane to form a cylindrical packing having an elongated, rod or wire line-receiving bore extending axially and centrally therethrough. The generally semicylindrical packing halves of the Scaramucci packing each include protuberant fingers axially spaced along the packing halves on opposite sides of the central cylindrical bore, and alternating with grooves of a generally complimentary shape into which the fingers of the opposite packing half project when the two halves are joined to form a composite packing.

The provision of the interlocking or meshing fingers on the two packing halves permits wearing of the packing adjacent the central axially extending bore to be compensated more easily by compression of the packing so as to cause the two packing halves to continually be moved toward each other as wear resulting in enlargement of the central axial bore occurs. The construction of the interlocking fingers is such that at the radially inner end of each finger, the respective finger projects to the bottom of the groove with which it mates or interleaves and thus provides a continuous unbroken surface around the central, axially extending bore, in this way obviating leakage of oil out through the several fingers and receiving grooves. Each of the respective fingers then extends outwardly at an angle with respect to a diameter of the composite packing so that the depth to which the radially outer portion of each finger projects into the respective receiving groove is substantially less than the close fit and total projection of the inner end of the respective finger to the bottom of the respective receiving groove so as to provide the continuous wall of elastomeric material around the central, axially extending bore.

The formation, during molding, of the interleaving and mating fingers and grooves to the precise geometry required to achieve the continuous, unbroken and completely confined bore through the composite packing, and yet achieve the gradual accommodation of rod wear through enlargement of the bore with continued sealing therearound, presents a difficult problem in terms of precise molding and continued assurance against leakage. Moreover, overcompression of the two-part packing of the type described tends to distort the central bore thereof out of a true cylindrical configuration when radial forces applied to the composite packing are not very evenly applied, and thus subject the composite packing to greater wear at one or more peripheral locations around the central axial bore than at others. The out-of-round character of the cylindrical bore thus becomes more aggravated and pronounced with continuing usage due to such uneven wear.

Various other types of split packings have heretofore been provided for the purpose of surrounding and packing off a reciprocating or moving rod which is coated with, or entrains, a liquid which is to be removed as the rod passes through the packing. Thus, in U.S. Pat. No. 3,076,659, a three-part oil wiper packing for reciprocating rods of the sort used in transmitting power from an engine, motor or other prime mover is illustrated and includes a plurality of radial channels or slots which communicate with the bore through the composite packing when the parts are assembled. The channels or slots function to collect oil wiped away by the composite packing rings, and to drain off this oil into a collecting sump disposed below the packing and rod assembly. The three segments or parts of the packing are retained in their interfitting or rod-surrounding relationship by a constricting band extended around the outer periphery of the three parts when joined in a cylindrical array.

In many types of split packings heretofore in use, the packings have been employed in oil well stuffing boxes for surrounding and wiping a polished rod which reciprocates through the composite packing formed by two halves fitted around the rod. In these instances, such as in Rattigan U.S. Pat. No. 2,685,465, the travel of the rod through the packing is bi-directional during the reciprocation of the rod.

Various types of interfitting or tongue-in-groove packings have heretofore been proposed and used, such as the packings shown in Tremolada U.S. Pat. No. 2,692,152, Wriedt U.S. Pat. No. 1,045,088, and Thompson U.S. Pat. No. 1,011,671. these patents, generally similar to the Scaramucci patent, have interlocking or dovetailing fingers and grooves formed in opposite halves of the packing, which halves are joined to form the sealing or packing elements surrounding a rod.

A slightly different type of packing or sealing member is shown in Copes U.S. Pat. No. 2,996,319. Protuberances carried on the opposite ends of one semicylindrical portion of the composite seal are dimensioned to project into, and interlock with, mating recesses formed in the other semicylindrical segment of the seal. The split mechanical seal of the Copes patent, like many of the other prior art structures involving split packings, is intended to receive a reciprocating rod and to seal about the periphery of the rod during reciprocation.

BRIEF DESCRIPTION OF THE PRESENT INVENTION

The present invention is a rod packing for stripping oil from a string of sucker rods as they are removed from an oil well, which packing, by reason of its split construction, can be very quickly and easily positioned around the sucker rod string and located within a rod packing housing where it is retained during use. The rod packing is of sturdy construction, and is geometrically configured to seal tightly around the rod string to effectively strip oil from the rod sections as the string is removed from the well through the packing. The packing also is constructed to permit the enlarged diameter rod boxes or couplings between rod sections to be pulled through the packing as the complete string is removed from the well without deleterious or injurious effect on the sealing and stripping action of the packing.

Broadly described, the rod packing of the present invention is a composite split packing which includes two interfitting semicylindrical packing halves or subelements which are joinable to each other at mating, abutting planar faces along a diametrical plane through the center of the packing. Joinder of the semicylindrical packing halves is effected by a plurality of pairs of mating protuberances and sockets. More specifically, in a preferred embodiment of the invention, each semicylindrical packing half carries, on the planer face thereof which abuts the other packing half, a pair of axially spaced, radially offset pins which project normal to the planar face of the packing half, and are dimensioned to mate or register with receiving recesses or cavities formed in the other semi-cylindrical packing half. The planar face of each packing half also is characterized in having recesses or cavities disposed on the opposite side of the planar face from the pins or protuberances, and functioning to receive the mating or registering pins or protuberances carried on the other of the two packing halves when the two are joined to form the composite packing.

Each of the packing halves is also characterized in having a semicircular upper end face, and a semicircular lower end face. The semicircular upper end face is indented or recessed to form a pair of spaced, substantially parallel grooves which are chordally oriented in relation to the cylindrically shaped composite packing when the two halves are joined. At the center of each of the semicircular planar end faces of each packing half, an axially projecting recess is formed in the packing half and has a geometric configuration which is one-half of a frustum of a cone. Stated differently, when the two packing halves are joined to form the composite packing, the cylindrical packing thus formed has a pair of circular planar end faces, and a frusto-conical recess is formed at the center of each end face. Each packing half is further characterized in having a semicylindrical groove formed centrally in the planar face of the packing which carries the pins and pinreceiving cavities. When the packing halves are joined, the semicylindrical grooves are aligned and are in registry, so that a cylindrical bore is formed through the center of the composite packing and communicates with the opposed frusto-conical recesses formed in the opposite end faces of the packing.

It is an important object of the present invention to provide a rod packing of elastomeric material for slidably engaging the rods of a sucker rod string when such string is removed from an oil well in which the sucker rod string has been functioning.

Another object of the invention is to provide a rod packing for engagement with the rods of a sucker rod string in a way which provides a continuous wiping or stripping action for the purpose of removing oil from the rods as they are pulled upwardly through the packing.

Another object of the invention is to provide an elastomeric, generally cylindrical composite packing which, in being made in two complementary halves joinable to each other, can be quickly and easily placed in position around an elongated rod to be wiped or stripped by the packing, and then placed within a confining packing housing for the purpose of compressing the packing and causing radial constriction of the packing so as to grip and wipe the rod as the rod is pulled through the packing.

An additional and further object of the invention is to provide an elastomeric rod packing which, though it is characterized in having a long and trouble-free operating life, and in functioning effectively in stripping oil from a string of rods pulled therethrough, is sufficiently flexible and adaptable in its usage to permit the coupling joints or sleeves used to couple rod sections to each other to be pulled through the packing without destroying the packing, or substantially lessening its effective functioning.

Additional objects and advantages of the invention will become apparent as the following detailed description of the invention is read in conjunction with the accompanying drawings which illustrate a preferred embodiment of the invention.

GENERAL DESCRIPTION OF THE DRAWINGS

DETAILED DESCRIPTION OF A PREFERRED EMBODIMENT OF THE INVENTION

The composite rod packing 10 of the invention is a cylindrical body of an elastomeric material. The composite packing 10 is made up of a pair of mating or registering packing halves 12 and 14 which are identically constructed so that each is semicylindrical in configuration and forms one half of the composite packing. The composite packing, of course, includes a pair of opposed, substantially parallel planar end faces 16 and 18 of circular configuration, with one of the end faces being denominated the upper end face and the other the lower end face.

Figure 4:
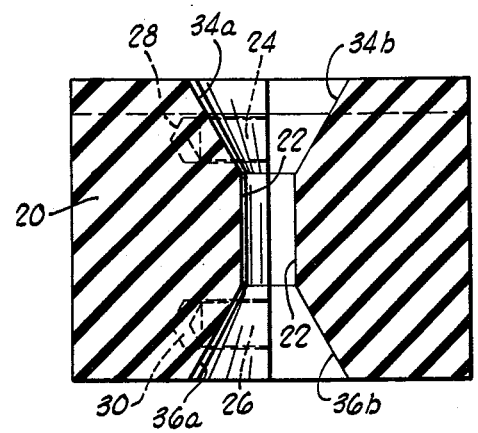
FIG. 4 is a vertical cross-sectional view of the composite rod packing of the invention taken along line 4—4 of FIG. 3.
Figure 5:
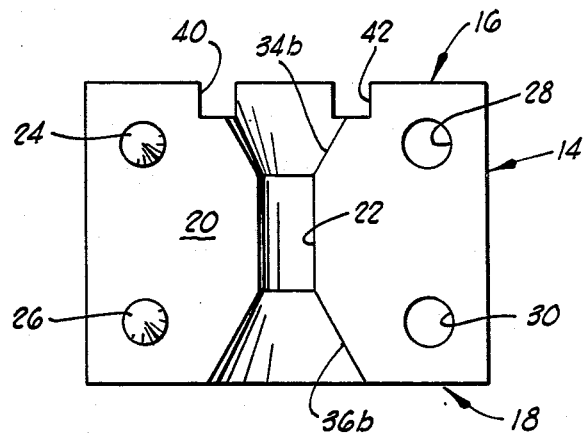
FIG. 5 is an elevational view of the planar face of one of the packing halves, illustrating the pins and sockets used for joining the packing halves to each other in making up the composite packing.

Each of the semicylindrical packing halves 12 and 14 includes a rectangularly shaped planar central face 20 (see FIG. 4). The planar central face 20 of each packing half has a centrally located, semicylindrical groove or channel 22 formed therein which is axially oriented with respect to the respective semicylindrical packing half 12 or 14 and also with respect to the composite packing 10 when the halves are joined as hereinafter described.

Each of the semicylindrical packing halves 12 and 14 also carries a pair of axially spaced pins or protuberances 24 and 26 which are spaced radially outwardly from the groove 22 and, as shown in dashed lines in FIG. 4 of the drawings, project substantially normal to the plane of the rectangularly shaped planar central face 20 of each packing half. On the opposite side of the planar central face 20 of each packing half from the pins or protuberances 24 and 26, each packing half carries a pair of recesses or cavities 28 and 30. The recesses or cavities 28 and 30 are positioned on the planar central face 20 of each of the packing halves 12 and 14 so that they will register with and receive the pins 24 and 26 on the other of the two packing halves when the packing halves are joined to form the composite packing 10 as hereinafter described. Preferably, the cavities or recesses 28 and 30 are slightly deeper than the length of each of the pins 24 and 26. It is also preferred that each of the pins 24 and 26 has a rounded or conically shaped outer free end, as shown in FIG. 4.

The opposite ends of each of the semicylindrical grooves 22 in the two packing halves 12 and 14 communicate with outwardly flaring recesses or cavities, denominated by reference numerals 34a and 36a in the case of the packing half 12, and 34b and 36b in the case of the packing half 14. The cavity 34a is shaped as one-half of a frustum of a cone, and is identically sized to the cavity 34b so that, when the two packing halves 12 and 14 are joined to form the cylindrical composite packing, the cavities 34a and 34b form a frusto-conical cavity of inverted configuration extending into the circular planar end face of the composite packing 10, and communicating at the inner end thereof with a cylindrical bore which is formed by the mating of the two semicylindrical grooves 22 formed centrally in the central planar face 20 of each packing half. The same geometric shape and relationship characterize the cavities 36a and 36b formed in the two packing halves. Thus, when the packing halves are joined in the composite packing 10, the cavities 36a and 36b register to form an inverted frusto-conical cavity which communicates at its inner end with the cylindrical bore formed by the registering semicylindrical grooves 22 in each of the two packing halves.

Figure 3:
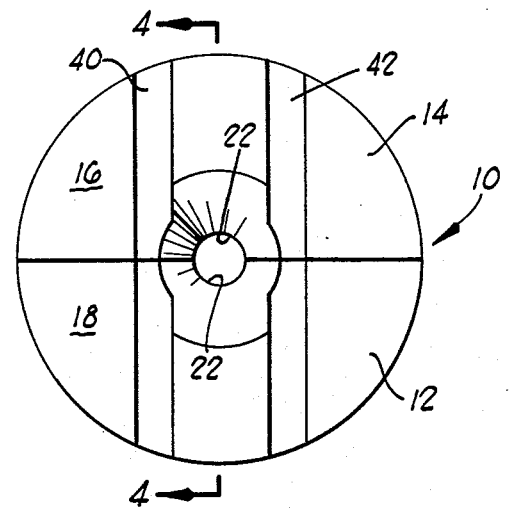
FIG. 3 is a plan view of the composite rod packing of the invention.

In the circular, planar upper end face of the composite packing 10, a pair of parallel, chordally extending fluid collection and runoff grooves 40 and 42 are formed in this face of the packing. Each of the grooves 40 and 42 is substantially rectangular in cross-section and is formed by the alignment and registration of groove segments formed in a chordal fashion in the semicircular upper end face of each of the packing halves 12 and 14. It will be noted in referring to FIG. 3 that the chordal grooves 40 and 42, though spaced on opposite sides of the central axis of the composite cylindrical packing, intersect the upper end portion of the frusto-conical cavity formed by the mated cavities 34a and 34b when the packing halves are joined. Communication is thus established between the grooves or channels 40 and 42 and the frusto-conical cavity projecting inwardly into the center of the planar upper end face of the composite packing 10.

Figures 1, 2:
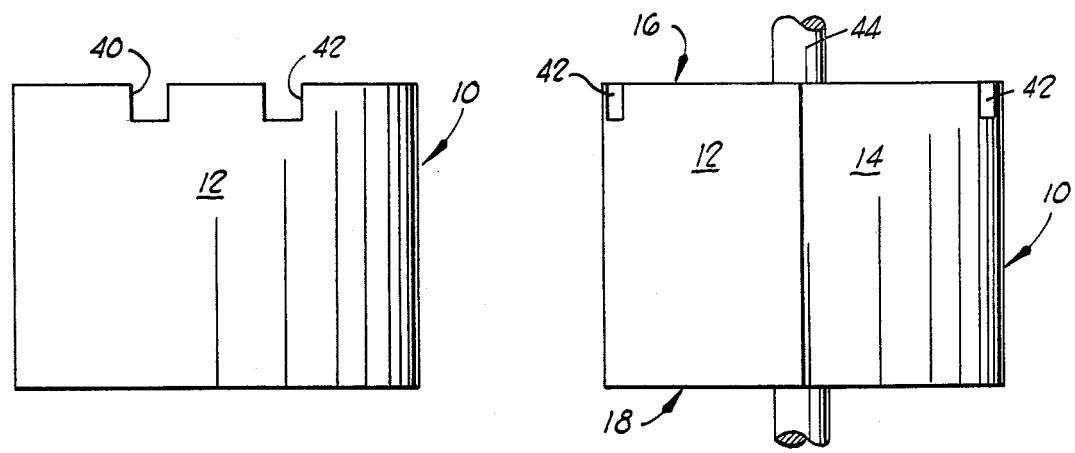
FIG. 1 is a side elevation view of the composite rod packing of the present invention.
FIG. 2 is a side elevation view of the composite rod packing of the invention after it has been rotated through 90° so as to illustrate, in FIG. 2, the plane of joinder of the two packing halves which make up the composite packing. A part of a rod extending through the composite packing is illustrated.

In the joinder of the packing halves 12 and 14 to each other to complete the assembly of the composite packing 10, one of the packing halves is placed on one side of a rod 44 (see FIG. 2) so that the rod lies in the semicylindrical groove 22 formed centrally in the packing half. The other packing half is then placed on the opposite side of the rod 44 in a position such that the free ends of the pins 24 and 26 carried on each of the packing halves are aligned with the cavities or recesses 28 and 30 formed in the central planar face 20 of the opposite of the two packing halves. The two packing halves 12 and 14 are then pressed together until the planar central faces 20 thereof abut each other, and the packing halves are interlocked by the registry of the respective pins 24 and 26 thereof with the cavities 28 and 30 carried on the other packing half. When so assembled, the packing halves 12 and 14 together form the composite cylindrical packing 10 and grip or engage the rod 44 extended centrally therethrough in the cylindrical bore constituted by the registering semicylindrical grooves 22.

After assembly of the composite packing 10 in this manner, the packing can be inserted in a metallic packing housing disposed at the well head over the oil well in which the rod string is in use. Such metalic housings (not shown) generally include a cylindrical outer wall and one or more axially confining retainer elements which partially close or restrict the opposite ends of the housing. A mechanical constricting element is positioned in the housing and around the composite packing, and can be hydraulically or manually constricted in a radial direction to subject the packing located on the inside of the packing housing to radially acting compressive force in a way such that the packing is urged radially inwardly against the rod which extends through the packing.

When the packing is radially constricted in this way, the rod is gripped or squeezed between the packing halves 12 and 14 so that, as the rod string is pulled out of the oil well, the composite packing functions to strip away oil carried on the rods and direct it back down into the well along the following rod string and inside the well tubing.

The particular mode of assembling the two packing halves about the rod and placing them in the packing housing is an important feature of the present invention, since such assembly can be effected very quickly and easily with the identically formed packing halves. There is no difficulty in correct fitting and assembly, since the packing halves are identically constructed and cannot be interfitted or interlocked in an incorrect relationship.

In the use of the packing, a sucker rod string can be removed through the packing at such a time as it is desired to swab or work over the well with the rod string used in pumping removed from the well and out of its operative position. With rod strings several thousand feet in length, and containing joints or couplings by which rods sections are joined to each other at frequent intervals over the length of the string, it is important that provision be made for accommodating wear of the elastomeric composite packing resulting from frictional engagement of the moving rod with the packing. In the present invention, such wear can be accommodated over an extended period of time due to the ability of the relatively short axial length of the cylindrical bore formed by the semicylindrical grooves 22 to move inwardly under compression, and to continue to effectively grip the outer periphery of the rod sections. The packing, in being maintained under continuously acting radially constrictive force during operation, is continuously forced inwardly toward the rod, and the gripping action is thus continuously renewed.

The frusto-conical cavity formed in the composite packing at the lower side thereof guides and channels the rod boxes or sleeves used to interconnect rod sections to each other up into and through the cylindrical bore at the center of the composite packing in such a way that the packing is not damaged due to misalignment of the rods, or due to the striking of the relatively larger diameter rod boxes against the lower planar end face of the packing as the rod is removed. The chordally extending channels or grooves 42 and 44 formed in the planar upper end face of the composite packing 10 function to receive any accumulations of oil which may result from failure of the packing to strip clean the rod sections as they are passed through the packing, and to prevent the accumulation of this oil on the total area of the end face on the upper side of the packing.

Although a preferred embodiment of the invention has been herein described in order to provide an exemplary illustration of the basic principles which underlie the invention, it will be understood that various changes and innovations can be effected and made in the described preferred embodiment without departure from such basic underlying principles. Changes and innovations of this type are therefore deemed to be circumscribed by the spirit and scope of the invention except as the same may be necessarily limited by the appended claims or reasonable equivalents thereof.

What is claimed is:

1. An elastomeric packing for stripping oil from an elongated member extended through the packing as the member is removed from an oil well comprising:
    a pair of packing halves detachably interconnected at a central plane of the packing, and each including a planar central face substantially coplanar with said central plane of the packing and having a semicylindrical groove formed centrally therein and a guiding cavity communicating with one end of said semicylindrical groove for guiding said elongated member into said cavity as said member is pulled through the packing;
    a plurality of spaced, cylindrical pins projecting normal to said central planar face and disposed to one side of said semicylindrical groove;
    a plurality of spaced cavities on the opposite side of said semicylindrical groove from said pins, each of said cavities being dimensioned and configured to mate with, and tightly receive, one of said pins;
    a pair of opposed end faces intersecting said planar central face, one of said end faces having said rod-guiding cavity opening in said face; and
    oil channel means in the other of said end faces communicating with said semicylindrical groove for receiving oil carried through said semicylindrical groove on said elongated member when said member is moved through said semicylindrical groove in the direction of said oil channel means.

2. An elastomeric rod packing as defined in claim 1 wherein said packing halves are identically constructed.

3. An elastomeric rod packing as defined in claim 2 wherein said packing is of cylindrical configuration, and each of said packing halves is of semicylindrical configuration.

4. An elastomeric rod packing as defined in claim 1 wherein each of said opposed end faces is a planar, semicircular face, and wherein said rod-guiding cavities together form a frusto-conical cavity in said packing having its small end positioned inwardly in the packing communication with each of said semicylindrical grooves.

5. An elastomeric rod packing as defined in claim 1 wherein said oil channel means comprises:
    a second cavity configured as a half of a frustum of a cone positioned at the opposite end of said semicylindrical groove from said guiding cavity, and opening outwardly therefrom into said one end face; and
    a pair of substantially parallel recesses in said one end face, extending substantially normal to said planar central face, and communicating with said second cavity configured as a half of a frustum of a cone.

6. An elastomeric packing as defined in claim 1 wherein each packing half has
    a pair of said pins thereon spaced radially outwardly from the axis of said semicylindrical groove in the respective packing half along a line extending parallel to said axis, each of said pins having a rounded outer free end; and
    a pair of said pin-receiving cavities spaced radially outwardly from the axis of said semicylindrical groove in the respective packing half along a line extending parallel to said axis, each of said pin-receiving cavities having a depth greater than the distance of projection of each of said cylindrical pins from said planar central face of the respective packing half.

7. An elastomeric packing as defined in claim 5 wherein each of said opposed end faces is a planar, semicircular face, and wherein said guiding cavities together form a frusto-conical cavity in said packing having its small end positioned inwardly in the packing in communication with the opposite end of said semicylindrical grooves from that end thereof communicating with the second cavities in the packing halves which are configured as a half of a frustum of a cone.

8. An elastomeric packing as defined in claim 7 wherein each of said packing halves is of semicylindrical configuration, and each of said end faces extends substantially normal to said planar central face.

9. An elastomeric packing as defined in claim 8 wherein each packing half has a pair of said pins thereon spaced radially outwardly from the axis of said semicylindrical groove in the respective packing half along a line extending parallel to said axis, and wherein said parallel recesses in said end faces extend as chords across the two substantially planar end faces at one end of said elastomeric packing.

* * * * *